United States Patent
Hoffmann

[15] 3,671,841
[45] June 20, 1972

[54] STEPPER MOTOR WITH STATOR BIASING MAGNETS

[72] Inventor: Gotfred O. Hoffmann, Cheshire, Conn.
[73] Assignee: Tri-Tech, Inc., Waterbury, Conn.
[22] Filed: May 1, 1970
[21] Appl. No.: 33,815

[52] U.S. Cl. .................... 318/696, 310/156, 310/49, 310/154
[51] Int. Cl. .................................................. H02k 37/00
[58] Field of Search ............ 310/263, 156, 154, 164; 318/138, 254, 696, 685

[56] References Cited

UNITED STATES PATENTS

| | | | |
|---|---|---|---|
| 2,548,633 | 4/1951 | Stephenson | 310/164 |
| 2,986,684 | 5/1961 | Cluwen | 318/254 X |
| 3,206,623 | 9/1965 | Snowden | 310/49 X |
| 3,293,459 | 12/1966 | Kreuter et al. | 310/49 |
| 3,402,334 | 9/1968 | Newton | 318/696 |
| 3,439,200 | 4/1969 | Saito et al. | 318/196 X |
| 3,495,107 | 2/1970 | Haydon | 310/156 |
| 3,495,113 | 2/1970 | Haydon | 310/156 |

Primary Examiner—G. R. Simmons
Attorney—Lee C. Robinson, Jr.

[57] ABSTRACT

A stepper motor having a pair of field coils, a pair of permanent magnet rotors carried by a single shaft such that their magnetic polarities are displaced ninety mechanical degrees from each other, and two pairs of stator pole pieces. Each pair of stator pole pieces is associated with a separate rotor and a separate field coil. A stationary permanent magnet is mounted on each pair of stator pole pieces, and the magnet generates a bias flux in opposition to the flux of the field coil associated with that pair of pole pieces. When electrical pulses of predetermined polarities are applied selectively to the field coils, there is produced a pre-determined angular advance of the rotor shaft.

17 Claims, 13 Drawing Figures

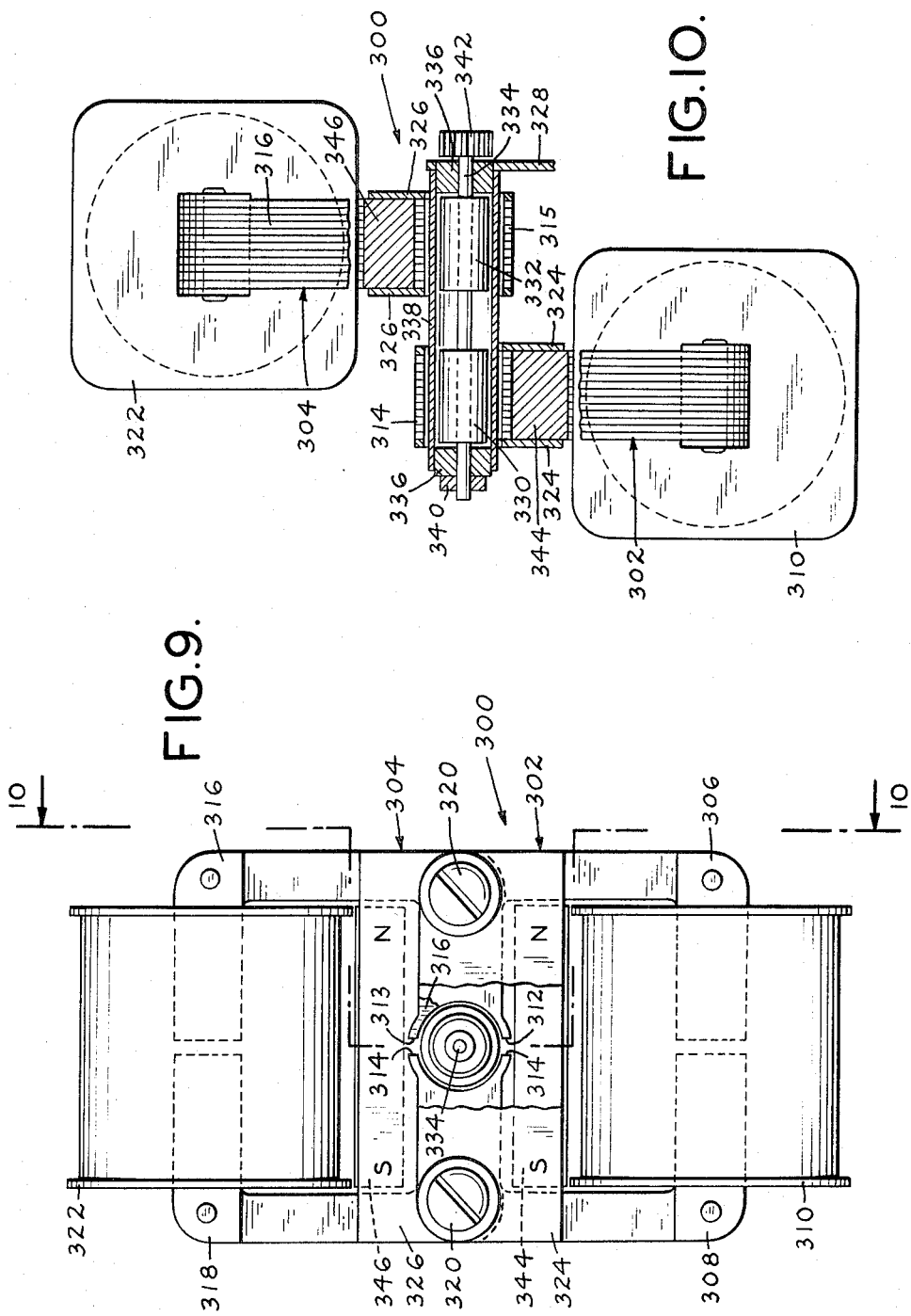

3,671,841

STEPPER MOTOR WITH STATOR BIASING MAGNETS

BACKGROUND OF THE INVENTION

The present invention relates to electric rotating machines and more particularly to small stepper or brushless DC motors. The motor embodiments disclosed herein have similarities in general configuration and operating principles to those disclosed in U.S. Pat. Nos. 3,370,189, 3,495,113 and 3,495,107; however, the present designs possess certain important operational as well as constructional and economical advantages over the motors described in those patents.

Many prior stepper motors require complex control circuitry and expensive center tapped field coils. In addition it often is desirable to provide such motors with an equilibrium position and some prior motors required excessive power in order to hold the rotors in such an equilibrium position. An additional disadvantage of such prior motors was that they did not have automatic and immediate return of the rotor to the equilibrium position when the field coils were de-energized.

The present invention overcomes these and other disadvantages by a novel design which additionally simplifies the manufacturing process of such stepper motors.

SUMMARY OF THE INVENTION

A preferred embodiment of the present invention comprises a pair of permanent magnet rotors mounted on a single shaft such that the magnetic polarities of the rotors are displaced ninety degrees from each other, a pair of field coils, each co-axial with a rotor, and two pairs of centrally orificed stator pole pieces, each pair including cup-shaped portions which enclose a rotor and a field coil.

Each pole piece includes a salient pole projecting along an axis parallel to the axis of rotation of, and spaced apart from, the rotor enclosed by the pair of pole pieces. The salient poles of each pair of pole pieces are aligned with the salient poles of the other pair of pole pieces.

A separate permanent magnet biasing means is mounted on the cup-shaped portions of each pair of pole pieces. The magnetic poles of each permanent magnet biasing means are magnetically linked to the adjacent salient stator poles and generate a biasing flux which passes through the corresponding rotor with a strength and direction which is respectively less than and opposed to the flux generated through the rotor by the co-axial field coil.

By selective energization of the field coils the rotor shaft may be turned to any one of the four angular orientations. For example, when neither field coil is energized the rotor shaft is held in its equilibrium position by the influence of the magnetic fields of each magnetic biasing means on their respective rotors.

When a selected first field coil is energized by the application of a voltage of pre-determined magnitude and polarity, the magnetic flux developed through the rotor encircled by the field coil is of opposite polarity to, and greater in magnitude than, the bias flux of the magnetic biasing means associated with the first field coil. The resultant magnetic flux exerts a torque on the rotor causing the rotor shaft to turn ninety degrees from the equilibrium position, clockwise or counterclockwise, depending on which field coil is energized. The rotor shaft is prevented from rotating one hundred and eighty degrees by the restraining torque exerted on the other rotor by the permanent magnetic biasing means associated with it.

When both field coils are energized by the application of a voltage of pre-determined polarity and magnitude, both magnetic biasing fields are neutralized, and the rotors turn 180° from the equilibrium position under the joint influence of the magnetic fields developed by the field coils.

If the second field coil only is energized by the application of a voltage of pre-determined polarity and magnitude, the magnetic flux developed through the second rotor is of opposite polarity to, and greater in magnitude than, the biasing flux of the magnetic biasing means associated with the second field coil. The resultant flux exerts a torque on the second rotor causing the rotor shaft to turn ninety degrees from the equilibrium position in a direction opposite to the angular rotation of the shaft when only the first field coil is energized. The rotor shaft is prevented from rotating one hundred and eighty degrees by the restraining torque exerted on the first rotor by the permanent magnet biasing means associated with it.

The rotor shaft may be turned through a 360° revolution by sequentially energizing a selected first field coil, then energizing both the field coils, next de-energizing the first field coil while continuing to energize the other field coil, and finally de-energizing both the field coils, returning the rotor shaft to its equilibrium position. The direction of rotation may be reversed by reversing the above sequence of energization of the field coils.

Another preferred embodiment of the invention comprises a pair of stator frames, each stator frame being formed of two opposed, generally "C" shaped pole pieces made from laminated stampings of suitable magnetic material. A separate field coil encircles portions of each pair of pole pieces. The two pole pieces making up a given stator frame each terminate at their distal ends from the field coil in stator poles. The pole faces of the pole pieces describe generally circular arcs inside of which is centered a portion of a rotor assembly. The rotor assembly is similar in construction to that of the cup-shaped embodiment described above, that is, a pair of permanent magnet rotors mounted on a single shaft such that the magnetic polarities of the rotors are displaced 90 mechanical degrees from each other. The rotor assembly is positioned with each rotor located between a separate pair of pole faces.

A separate permanent magnet biasing means is mounted between the pole pieces which make up each stator frame. The magnetic poles of the permanent magnet biasing means are magnetically linked to the stator poles at the ends of each of the members. The permanent magnet biasing means each generate a biasing flux which passes through the rotor associated with those stator poles with a strength and direction which is respectively less than and opposed to the flux generated through that rotor by the field coil encircling those pole pieces.

In operation, this embodiment is similar in physical principles to the cup-shaped embodiment discussed above. By selective energization of the field coils, the rotor shaft may be turned to any one of four angular orientations or turned sequentially through all four orientations.

The stepper motor of the invention may be used as a reversible drive for counters or potentiometers or for other applications in which conventional stepper motors are used. In addition, the novel characteristic of automatic and immediate return of the rotors to the equilibrium position when both field coils are de-energized allows the stepper motor to be operated as a four-position indicator. In one embodiment a four-pole, single-throw switch using two diodes controls the stepper motor as a four-position indicator.

The permanent magnet rotors have a greater length than diameter and thus are "slim." Among other advantages, this design tends to minimize the rotational inertia of the rotors. As a result, the rotors start substantially instantaneously upon the energization of either or both field coils.

It is therefore an object of the present invention to provide a stepper motor of small size and simple construction and which requires no power in its equilibrium position.

It is another object of this invention to provide a three-wire stepper motor capable of rotating a full three hundred and sixty mechanical degrees in discrete steps upon the application of electrical signals to selected field coils.

It is still a further object of the present invention to provide a small, cylindrical stepper motor having low maintenance requirements.

The foregoing and other objectives, features, and advantages of the invention will be more readily understood upon consideration of the following detailed description of

BRIEF DESCRIPTION OF THE DRAWINGS

FIG. 3 is a perspective exploded view of the stator structure of the embodiment of FIG. 1;

FIGS. 5a, 5b, 5c and 5d are diagrammatic views illustrating the operation of the embodiment of FIG. 1;

FIG. 9 is a vertical view of another embodiment of this invention with a portion of the stator structure shown broken away;

FIG. 10 is a sectional view of the embodiment of FIG. 9 taken generally along the line 10—10.

DESCRIPTION OF CERTAIN PREFERRED EMBODIMENTS

Figure 1:
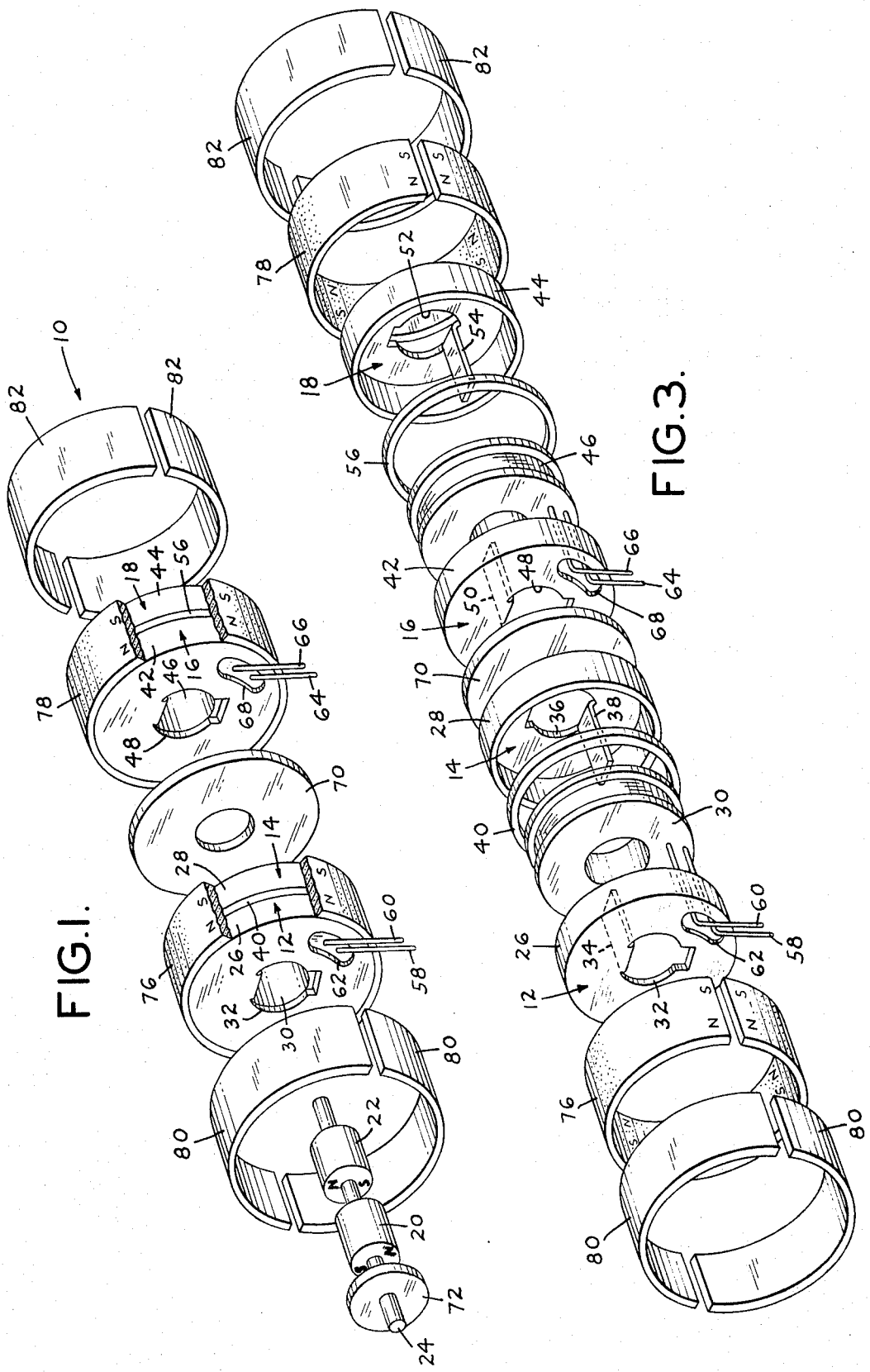
FIG. 1 is a perspective, partially exploded view of one embodiment of this invention, with a portion of the magnetic biasing means shown broken away.
Figure 2:
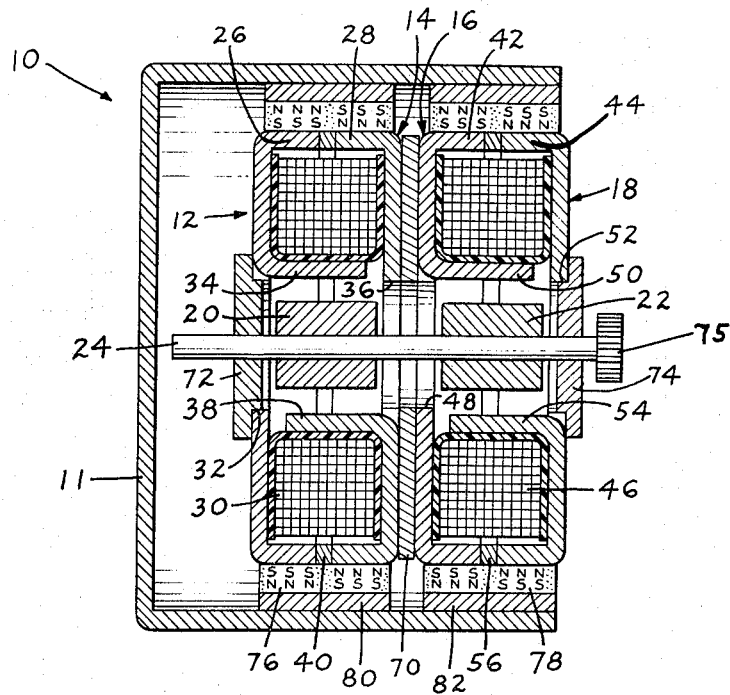
FIG. 2 is a vertical sectional view of the embodiment of FIG. 1.

Referring now more particularly to FIGS. 1, 2 and 3, there is shown a stepper motor 10 which includes two pairs of stator pole pieces 12 and 14, and 16 and 18, and a pair of permanent magnet bipole rotors 20 and 22 mounted on a single rotor shaft 24. The magnetic polarity of the rotor 20 is displaced 90 degrees from the magnetic polarity of the rotor 22.

The pole pieces 12, 14, 16 and 18 each comprise a centrally orificed, cup-shaped disc having only a single stator pole extending perpendicularly from the edge of a portion of the orifice along an axis parallel to the axis of rotation of the rotors 20 and 22. The pole pieces 12 and 14 include projecting flanges 26 and 28, respectively, which enclose the rotor 20 and a field coil 30 which is co-axial with the rotor 20. The pole piece 12 has a central orifice 32 and a salient pole 34 projecting perpendicularly from the edge of the orifice along an axis parallel to the axis of rotation of the rotor 20. The pole piece 14 has a central orifice 36 and a salient pole 38 projecting perpendicularly from the edge of the orifice along an axis parallel to the axis of rotation of the rotor 20. The stator poles 34 and 38 are diametrically opposed and are spaced apart from the rotor 20. The field coil 30 encircles the poles 34 and 38 and is in magnetic circuit relationship with them. When the pole pieces 12 and 14 are assembled together, the flanges 26 and 28 are separated by a non-ferrous washer 40.

In a similar manner, the pole pieces 16 and 18 include projecting flanges 42 and 44, respectively, which enclose the rotor 22 and a field coil 46 which is co-axial with the rotor 22. The pole piece 16 has a central orifice 48 and a salient pole 50 projecting perpendicularly from the edge of the orifice along an axis parallel to the axis of rotation of the rotor 22. The pole piece 18 has a central orifice 52 and a salient pole 54 projecting perpendicularly from the edge of the orifice along an axis parallel to the axis of rotation of the rotor 22. The stator poles 50 and 54 are diametrically opposed and are spaced apart from the rotor 22. When the pole pieces 16 and 18 are assembled together, the flanges 42 and 44 are separated by a non-ferrous washer 56. The field coil 46 encircles the poles 50 and 54 and is in magnetic circuit relationship with them.

The leads 58 and 60 of the field coil 30 are brought out through an opening 62 in the pole piece 12. The leads 64 and 66 of the field coil 46 are brought out through an opening 68 in the pole piece 16. In other advantageous embodiments one lead from each coil may be brought out along with one lead common to both coils so that the motor has only three wires.

The pole pieces 12, 14, 16 and 18 may be stamped from cold rolled steel of suitable thickness or may be made of powdered iron. In a particular example the magnetic material may be 0.045 inch in thickness for discs about one inch in diameter. The pairs of pole pieces 12, 14, 16 and 18 are positioned on either side of a non-ferrous disc 70. A cup-shaped casing 11 emcompasses the assembled motor 10 (see FIG. 2).

The rotors 20 and 22 are comprised of long cylinders of ceramic magnetic material which is magnetized permanently with opposite north and south poles, as indicated by N and S in FIGS. 1 and 5a–5d. In order to have high coercivity, low permeability, a low specific gravity and a high magnetic energy product, a relatively "hard" material magnetically is used.

The magnetic energy product should be at least $3.0 \times 10^6$ gauss-oersteds along the axis of magnetic orientation for best results. One such material is barium ferrite having a composition $Ba\ Fe_{12}\ O_{19}$. Representative barium ferrite materials are Ceramagnet A, A19 and A70 manufactured by Stackpole Carbon Company, Electronic Components Division, St. Marys, Pennsylvania, and Index I and Index V manufactured by Indiana General Corporation, Valparaiso, Indiana. Another suitable material is Plastiform available from the Leyman Corporation, Cincinnati, Ohio.

The rotors also may be fabricated from a 77 percent platinum, 23 percent cobalt material made by the Hamilton Watch Company of Lancaster, Pennsylvania. This latter material has a residual induction of 6,400 gauss, a coercive force of 4,300 oersteds and a maximum energy product of $9.0 \times 16^6$ gauss-oersteds.

The rotors 20 and 22 are provided with axial holes into which the rotor shaft 24 is secured as by cementing, moulding or other suitable techniques. In some cases comparatively thin washers of the magnetized material are placed in stacked relationship with each other. The washers are adhesively held together to form each rotor. In other preferred embodiments, particularly in those using Plastiform, the Plastiform material may be extruded in tubular form, cut into the desired lengths and pressed on the shaft 24.

The rotor shaft 24 is mounted at each end in bearings 72 and 74 inserted in the central orifices 32 and 52 of the stator pole pieces 12 and 18, respectively. A gear 75 may be affixed to the end of the rotor shaft 24.

Some prior stepper motors use a comparatively large number of stator and rotor poles. Such motors required a relatively large circumferential area of rotor surface to accommodate these poles in order to have a useful torque output. To obtain a large circumferential area the rotors needed to be of relatively large diameter when compared with their lengths. The rotational inertia of the rotors varies directly as the fourth power of their diameters, and thus large diameter rotors have a substantially greater rotational inertia than slim rotors.

Large rotational inertia in the rotors is a particular disadvantage in stepper motors, in which the rotors must respond quickly to electrical impulses applied to the field coil. In the embodiment of FIG. 1 there are employed two pairs of long salient stator poles 34 and 38 and 50 and 54. This allows the use of a pair of "slim" rotors 20 and 22, that is, ones having a greater length than diameter, which have a low rotational inertia. Thus the rotors 20 and 22 are capable of substantially instantaneous starting and stopping when pulses are selectively applied to the field coils 30 and 46.

The torque available to operate the motor is increased by the use of long rotors. A relatively high torque is produced when the ratio of rotor length to diameter is within the range of from about 1.25 to 1 to about 2 to 1; a ratio of 1.5 to 1 is particularly suitable. The net usable torque falls off markedly when this ratio approaches 1 to 1.

Continuing the description now with particular reference to FIGS. 2 and 3, there are shown polarized permanent magnets 76 and 78 which are annular shaped strips of Plastiform tape. The permanent magnet 76 is wrapped around the outside of the flanges 26 and 28 of the assembled cup-shaped pole pieces 12 and 14. The permanent magnet 78 is wrapped around the outside of the flanges 42 and 44 of the assembled cup-shaped pole pieces 16 and 18. The gaps at the ends of the Plastiform strips as shown in FIG. 3 do not have a magnetic function, and the permanent magnets 76 and 78 may be complete rings.

The strip 76 has a magnetic polarization such that the inside surface of the one half of its width which attaches to the flange 28 is a north (N) pole and the inside surface of the other one half of its width which attaches to flange 26 is a south (S) pole. A pair of sleeves 80 of magnetic material are affixed in magnetic circuit relationship with the permanent magnet 76. These sleeves are in the form of semicircular bands and provide a flux linkage for the outside surface of the magnet 76 in order to enhance the magnetic flux available at the inside surface of the magnet 76.

The strip 78 has a magnetic polarization such that the inside surface of the one half of its width which attaches to the flange 44 is a north (N) pole and the inside surface of the other one half of its width which attached attaches flange 42 is a south (S) pole. A pair of sleeves 82 of magnetic material are affixed in magnetic circuit relationship with the permanent magnet 78 to provide a flux linkage for the outside surface of the magnet 78 in order to enhance the magnetic flux available at the inside surface of the magnet 78.

The sleeves 80 and 82 are described and shown as being comprised of a pair of semicircular bands because such a shape simplifies the mounting of the sleeves on the permanent magnets 76 and 78. In other embodiments the sleeves may be annular bands, for example.

If the permanent magnet strips 76 and 78 are made of a material which is magnetized along its greater dimension, that is, such that the right sides of the annular strips 76 and 78 as viewed in FIG. 3 are north (N) poles and the left sides are south (S) poles, then the sleeves 80 and 82 are unnecessary.

In still other embodiments the permanent magnets 76 and 78 and sleeves 80 and 82 are mounted on the inside of the flanges 26, 28, 42 and 44. The field coils 30 and 46 may also be mounted on the outside of the flanges 26, 28, 42 and 44, respectively.

Figure 4:
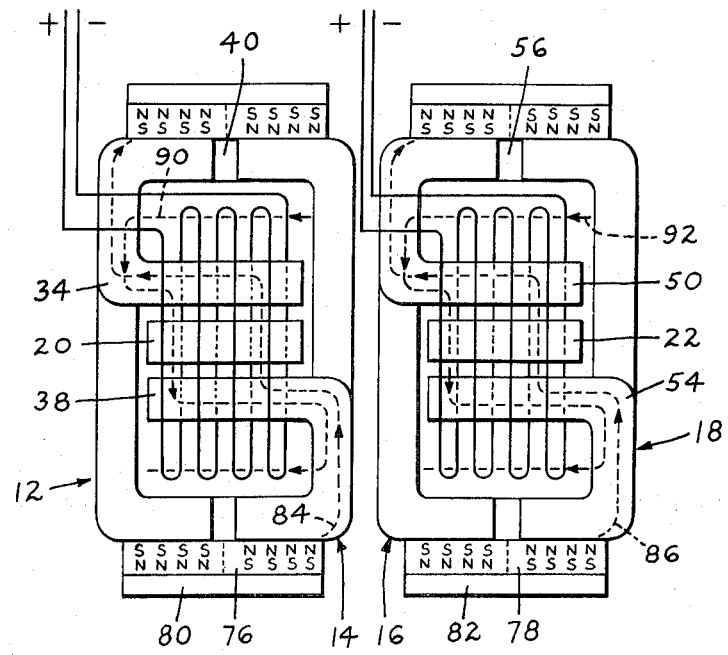
FIG. 4 is a schematic representation of the magnetic circuit of the embodiment of FIG. 1.

Referring to FIGS. 4 and 5, the permanent magnet member 76 generates a bias flux which flows through the magnetic circuit of the motor along the path 84 from the north (N) pole of magnet 76 along through the pole piece 14 to the stator pole 38, then radially across the rotor-stator air gap and the rotor 20 to the stator pole 34, along the pole 34 and then through the pole piece 12 to the south (S) pole of magnet 76 making a complete magnetic circuit. The gap occupied by the non-ferrous washer 40 between the stator pole pieces 12 and 14 is provided to ensure that the bias flux flows along the stator poles 34 and 38.

The bias flux provided by the permanent magnet member 78 follows a similar magnetic circuit path 86 from the north (N) pole of magnet 78 along through the pole piece 18 to the stator pole 54, then radially across the rotor-stator air gap and the rotor 22 to the stator pole 50, along the pole 50 and then through the pole piece 16 to the south (S) pole of magnet 78 making a complete magnetic circuit. The gap occupied by the non-ferrous washer 56 between the stator pole pieces 16 and 18 is provided to ensure that the bias flux flows along the stator poles 50 and 54.

The operation of the embodiment of FIG. 1 is illustrated in FIGS. 5a, 5b, 5c and 5d. An indicator disc 88 is affixed to the end of the rotor shaft 24 closest to the rotor 20 for purposes of illustrating the angular position of the rotor shaft 24.

In the equilibrium condition, when both the field coils 30 and 46 are de-energized, the directions of the bias fluxes from the magnets 76 and 78 which pass through rotors 20 and 22 are such that the rotor shaft 24 becomes stabilized in the alignment shown in FIG. 5a as position A. In this orientation the south (S) regions of the rotors 20 and 22 are attracted by, and try to align opposite, the stator poles 38 and 54, which are magnetically connected to the north (N) poles of the magnets 76 and 78, respectively.

Correspondingly, the north (N) pole regions of the rotors 20 and 22 try to align opposite the stator poles 34 and 50 which are linked to the south (S) poles of the bias magnets 76 and 78, respectively. Each time the field coils 30 and 46 are both de-energized, the motor 10 returns to the equilibrium position A, and the rotors 20 and 22 assume the same orientations.

Upon energization of the field coil 30 with an electrical pulse of pre-determined polarity and amplitude, a magnetic flux is produced in the magnetic circuit of the motor 10 which flows through the rotor member 20 in a direction directly opposite that of the bias flux produced by the permanent magnet 76. When a pulse of a polarity such that the left-hand side of the field coil 30, as viewed in FIG. 4, becomes a north pole, and the right-hand side a south pole, the field coil flux flows along the path 90 from the north or left side of field coil 30, along through the pole piece 12 to the stator pole 34, then radially across the rotor-stator air gap and rotor 20 to the stator pole 38, along the pole 38 and then through the pole piece 14 to return to the south or right side of field coil 30 completing the magnetic circuit.

Another field coil flux path is from the north or left side of field coil 30, along through the pole piece 12, across the gap occupied by the washer 40, and along through the pole piece 14 to return to the south or right side of field coil 30.

The magnitude of the field coil flux flowing in the stator poles 34 and 38 is substantially twice as large as the bias flux from the permanent magnet 76, to override the influence of the bias flux in the rotor-stator air gap. The resulting net magnetic field through the rotor 20 is equal in magnitude to the bias flux but in the opposite direction.

Figure 5D:
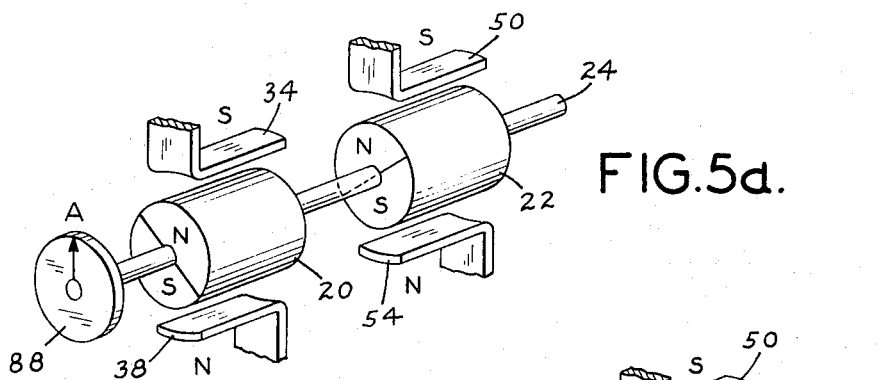
Figure 5B:
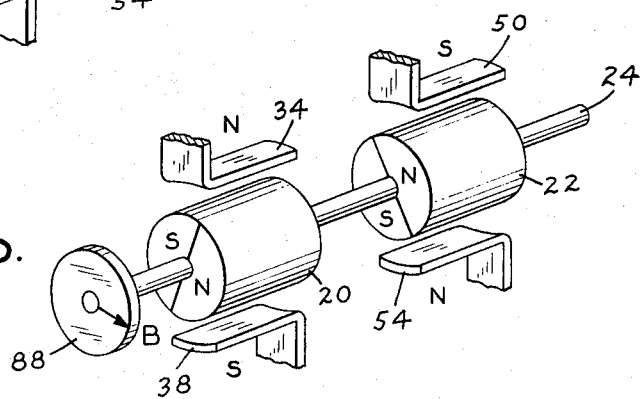

As illustrated in FIG. 5b, the stator pole 34 thus becomes polarized north (N) and the stator pole 38 becomes polarized south (S). This reversal in direction of the composite stator flux acting on the rotor 20 produces forces of magnetic attraction and repulsion on the magnetized pole regions of the rotor. These magnetic forces cause the rotor 20 to try to align its north (N) pole opposite the stator pole 38 and its south (S) pole opposite the stator pole 34.

The rotor 20 is prevented from rotating the shaft 24 180 degrees by the restraining forces of substantially equal magnitude but opposite direction exerted on the magnetic poles of the rotor 22 by the bias flux due to the permanent magnet 78. These restraining forces cause the rotor 22 to continue to try to align its north (N) pole with the stator pole 50 and its south (S) pole with the stator pole 54 which are respectively linked to the opposite magnetic poles of the permanent magnet 78. The resulting torque exerted by all the magnetic forces on the shaft 24 through the rotors 20 and 22 causes the shaft 24 to rotate clockwise (as viewed in FIG. 5b) 90 degrees from its equilibrium position A and stabilize at position B.

Energization of the field coil 46 with an electrical pulse of pre-determined polarity and amplitude generates a magnetic flux in the magnetic circuit of the motor 10 which flows through the rotor member 22 in a direction directly opposite that of the bias flux produced by the permanent magnet 78. When a pulse of a polarity such that the left-hand side of the field coil 46, as viewed in FIG. 4, becomes a north pole, and the right-hand side a south pole, the field coil flux flows along the path 92 from the north or left side of the field coil 46, along through the pole piece 16 to the stator pole 50, then radially across the rotor-stator air gap and rotor 22 to the stator pole 54, along the pole 54 and then through the pole piece 18 to return to the south or right side of field coil 46 completing the magnetic circuit.

Another field coil flux path is from the north or left side of field coil 46, along through the pole piece 16, across the gap occupied by the washer 56, and along through the pole piece 18 to return to the south or right side of field coil 46.

The magnitude of the field coil flux flowing in the stator poles 50 and 54 is substantially twice as large as the bias flux from the permanent magnet 78 to override the influence in the rotor-stator air gap of the bias flux. The resulting net magnetic field through the rotor 22 is equal in magnitude to the bias flux but in the opposite direction.

Figure 5C:
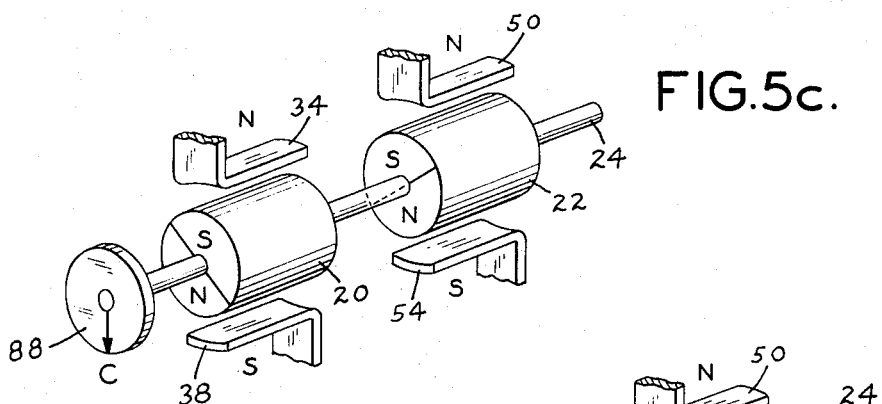
Figure 5D:
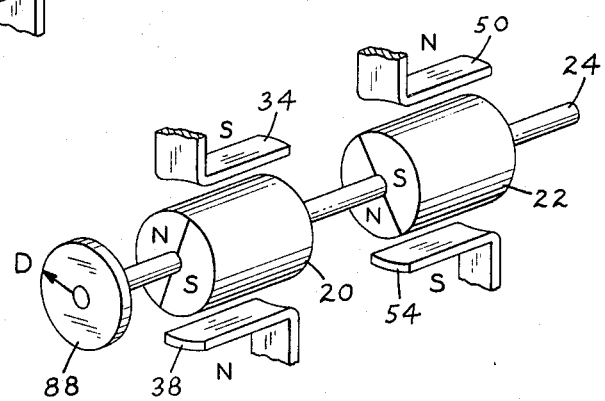

As illustrated in FIG. 5c, the stator pole 50 becomes polarized north (N) and the stator pole 54 becomes polarized south (S). This reversal in direction of the composite stator flux acting on the rotor 22 produces forces of magnetic attraction and repulsion on the magnetized pole regions of the rotor. These magnetic forces cause the rotor 22 to try to align its north (N) pole opposite the stator pole 54 and its south (S) pole opposite the stator pole 50.

Upon the simultaneous energization of both of the field coils 30 and 46 with electrical pulses of a predetermined polarity and magnitude, magnetic fluxes are generated by the field coils 30 and 46 in their respective pairs of pole pieces 12, 14, 16 and 18 which are substantially twice as large as the bias fluxes generated therein by the permanent magnets 76 and 78. As described above, these field coil fluxes override the influence in the rotor-stator air gaps of the bias fluxes from the permanent magnets 76 and 78 to produce net magnetic fields equal in magnitude to the bias fluxes but in the opposite direction through the rotors 20 and 22.

The stator poles 34 and 50 in such case become polarized north (N) and the stator poles 38 and 54 become polarized south (S). The net magnetic fluxes of attraction and repulsion exerted on the magnetized pole regions of the rotors 20 and 22 cause the rotors to try to align their north (N) poles opposite the stator poles 38 and 54 and their south (S) poles opposite the stator poles 34 and 50. The resulting torque exerted by all the magnetic forces on the shaft 24 through the rotors 20 and 22 causes the shaft 24 to rotate clockwise 90 degrees from position B to stabilize at position C (see FIG. 5c).

Upon the de-energization of the field coil 30 while maintaining the energization of the field coil 46, the magnetic polarities of the stator poles 34 and 38 are reversed. The biasing magnetic forces due to the permanent magnet 76 act on the pole regions of the rotor 20 to cause it to try to align its north (N) pole opposite the stator pole 34 and its south (S) pole opposite the stator pole 38. The rotor 20 is prevented from returning the shaft to the equilibrium position A by the restraining force of substantially equal magnitude but opposite direction exerted on the pole regions of the rotor 22 by the magnetic flux from the field coil 46. The resulting torque on the shaft 24 exerted through the rotors 20 and 22 causes the shaft 24 to rotate clockwise 90 degrees from position C to stabilize at position D as illustrated in FIG. 5d.

When both of the field coils 30 and 46 are deenergized, the rotors 20 and 22 and the shaft 24 return to the equilibrium position A due to the influence of the biasing magnetic fields on the rotors 20 and 22.

The shaft 24 and the rotors 20 and 22 may be rotated in the opposite direction by reversing the above sequence of energization and de-energization of the field coils 30 and 46. Furthermore, it is not necessary to energize the field coils 30 and 46 in a particular sequence in order to rotate the shaft 24 to one of the four positions A, B, C, or D. The shaft 24 may be rotated to a selected position by energizing the field coil or field coils associated with that position. For example, the shaft 24 may be rotated to position B by energizing only the field coil 30. From position B the shaft 24 may be rotated to position D by simultaneously de-energizing the field coil 30 and energizing the field coil 46.

Although the embodiment discussed above comprises a pair of bipole permanent magnet rotors 20 and 22 mounted on a shaft 24 in such a way that the magnetic polarities of the rotors are displaced 90 degrees from each other, the invention contemplates several other arrangements. For example, while a 90 degree angular displacement of the rotors is particularly satisfactory in bringing about the rapid stabilization of the rotor shaft for each position, other embodiments have angular displacements of the rotors which are greater or less than 90 degrees.

In still another embodiment the magnetic poles of the rotors are aligned but the pairs of stator poles are displaced substantially 90 degrees from each other. Such an embodiment may also combine the two rotors to form a single, long cylindrical permanent magnet rotor.

Figure 6:
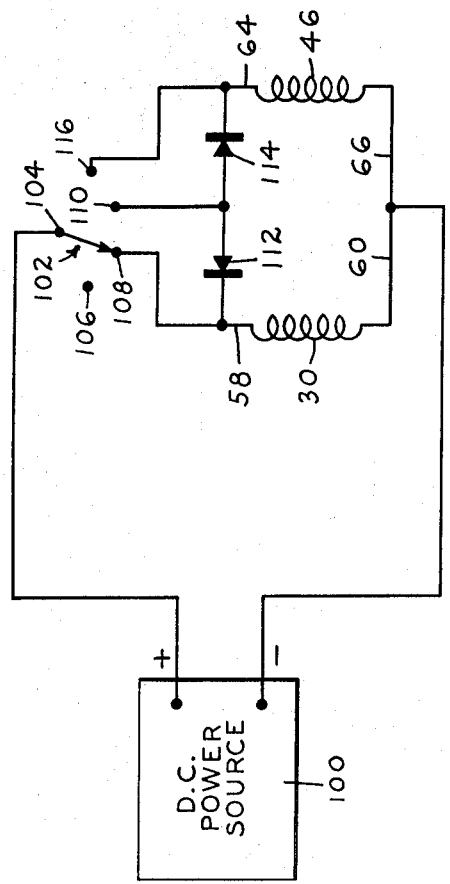
FIG. 6 is a schematic representation of a control circuit for the embodiment of FIG. 1.

Referring now to FIG. 6, there is shown a control circuit for operating the embodiment of FIG. 1 as a four-position indicator. The circuit includes a DC power source 100 and a four terminal, rotary switch 102 having a contact arm 104 connected to the positive terminal of the power source. The leads 60 and 66 of the field coils 30 and 46 are connected to the negative terminal of the power source.

The first terminal 106 of the switch 102 is unconnected and constitutes a neutral switch position corresponding to the equilibrium alignment A of the rotor shaft 24. The second terminal 108 of the switch 102 is connected to the lead 58 of the field coil 30. The third terminal 110 of the switch 102 is connected to the anode of a diode rectifier 112, the cathode of which is connected to the lead 58. The polarity of the diode 112 is such that current may flow from the terminal 110 through the diode 112, the lead 58, the field coil 30, and the lead 60 to the power source 100. The terminal 110 also is connected to the anode of a diode rectifier 114, the cathode of which is connected to the lead 64 of the field coil 46. The polarity of the diode 114 is such that current may flow from the terminal 110 through the diode 114, the lead 64, the field coil 46, and the lead 66 to the power source 100. The fourth terminal 116 of the switch 102 is connected to the lead 64 of the field coil 46.

In operation, when the arm 104 of the switch 102 is in contact with the first terminal 106, the rotor shaft 24 is oriented in the equilibrium position A. When the arm 104 is rotated to contact the second terminal 108, the current flows from the positive outlet of the power source 100 through the arm 104, the terminal 108, the lead 58, the field coil 30, and the lead 60 to return to the negative outlet of the power source 100, causing the rotor shaft 24 to rotate to the position B.

When the arm 104 contacts the third terminal 110, the current flows from the power source 100 through the arm 104, the third terminal 110, the diodes 112 and 114, the leads 58 and 64, the field coils 30 and 46, and the leads 60 and 66 to return to the power source 100, thereby causing the rotor shaft 24 to rotate to position C.

When the arm 104 is rotated to contact the fourth terminal 116, the current flows from the power source 100 through the arm 104, the fourth terminal 116, the lead 64, the field coil 46, and the lead 66 to return to the power source 100, thereby causing the rotor shaft 24 to rotate to position D.

Figure 7:
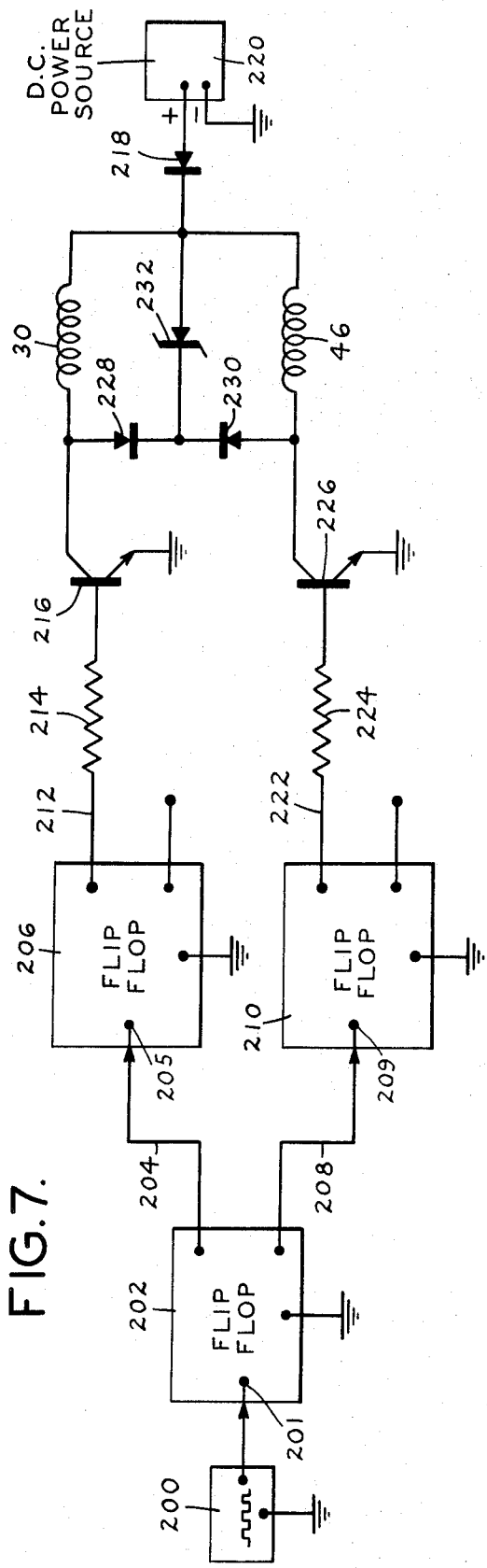
FIG. 7 is a schematic representation of a logic circuit for sequential operation of the embodiment of FIG. 1 as a brushless DC motor.

The motor 10 may be operated as a brushless DC motor by the use of suitable logic circuitry. Referring to FIG. 7 one such logic circuit is shown as comprising a source 200 of positive DC pulses which are fed to the input 201 of the bistable multivibrator or flip-flop circuit 202. An output 204 of the flip-flop 202 is connected to the input 205 of a second flip-flop 206. Another output 208 of the flip-flop 202 is connected to the input 209 of a third flip-flop 210.

An output 212 of the flip-flop 206 is connected through a resistor 214 to the base of an NPN transistor 216 which operates as an electronic switch. The emitter of the transistor 216 is grounded. The collector is connected in series with the field coil 30 to the cathode of a diode rectifier 218, the anode of which is connected to a source of positive voltage 220. The diode 218 has a polarity such that when the transistor 216 is properly biased the current may flow from the source of positive voltage 220 through the diode 218, the field coil 30, the collector of the transistor 216 and thence through the emitter to ground. The other output 213 of the flip-flop circuit 206 is unconnected.

The output 222 of the flip-flop 210 is connected through a resistor 224 to the base of an NPN transistor 226 which operates as an electronic switch. The emitter of the NPN transistor 226 is grounded and the collector is connected in series with the field coil 46 to the cathode of the diode 218.

Two diode rectifiers 228 and 230 are connected in series between the collectors of the transistors 216 and 226. The anodes of the diodes 228 and 230 are connected to the collectors and the cathodes are connected to the cathode of a zener diode 232. The anode of the diode 232 is connected to the cathode of the diode 218. The polarities of the diodes 228, 230 and 232 are such that no current below a certain pre-determined potential may flow in a direction from the collectors of the transistors 216 or 226 to the diode 218. The diodes 228, 230 and 232 thus act as a suppression network.

Figure 8:
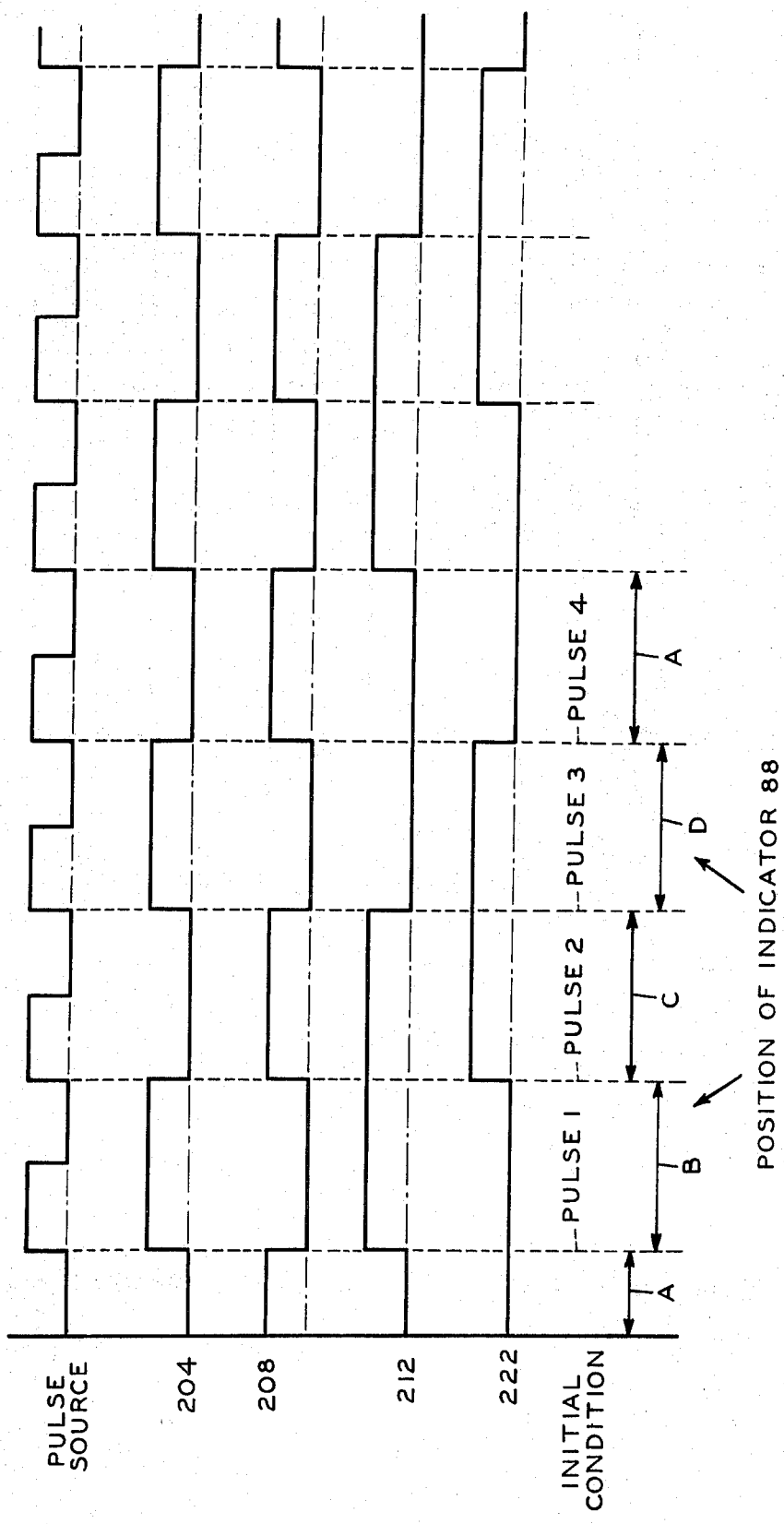
FIG. 8 is an illustrative graph of the output signals of the logic circuit of FIG. 7.

The operation of the embodiment of FIG. 7 may best be explained by reference to FIG. 8 which is an illustrative graph of the outputs of the flip-flops 202, 206 and 210. When any of the outputs 204, 208, 212 or 222 are in an "on" state, they are at a pre-determined positive potential with respect to ground. When they are in their "off" state, they are at substantially zero potential with respect to ground.

If an initial state is assumed wherein the output 204 is "off," the output 208 is "on," the output 212 is "off" and the output 222 is "off," the rotor shaft 24 will be in the equilibrium position A (see FIG. 5a). The first pulse from the source 200 to the input 201 of the flip-flop 202 will cause the output 204 to come "on" and the output 208 to turn "off." This change in the output status of the flip-flop 202 has no effect on the flip-flop 210 because the inputs of the flip-flops 206 and 210 only respond to positive going pulses, which only occur when the outputs 204 or 208 change from the "off" state to the "on" state.

The change of state of the flip-flop 202 such that output 204 is now "on" causes the flip-flop 206 to change state so that the output 212 becomes "on." This has the effect of biasing the transistor 216 so as to become a closed switch between the collector and the emitter, which energizes the field coil 30. As described above, energization of the field coil 30 causes the rotor shaft 24 to turn to position B.

The second pulse to the flip-flop input 201 from the source 200 again causes the flip-flop 202 to change state such that the output 204 is now "off" and the output 208 is now "on." The change in state of the flip-flop 202 has no effect on the state of the flip-flop output 212, but it does cause the flip-flop output 222 to change state to "on." This biases the transistor 226 so as to become a closed switch between its collector and emitter, thereby energizing the field coil 46. Energization of the field coil 46, while continuing to energize the field coil 30, causes the rotor shaft 24 to rotate to the position C.

The third pulse to the input 201 from the source 200 changes the state of the flip-flop 202 such that the output 204 is now "on" and the output 208 is "off." The change in state of the flip-flop 202 has no effect on the flip-flop 210, but it does cause the output 212 of the flip-flop 206 to change state from "on" to "off." This biases the transistor 216 to become an open switch between its collector and emitter, thereby de-energizing field coil 30. With the field coil 30 de-energized and the field coil 46 energized, the rotor shaft 24 will now rotate to the position D.

The fourth pulse from the source 200 will restore the flip-flops 202, 206 and 210 to their initial conditions, thereby de-energizing both the field coils 30 and 46 and returning the rotor shaft 24 to the equilibrium position A.

Although a source 200 of positive pulses and positive pulse responsive flip-flops 202, 206 and 210 are referred to above, other embodiments use a source of negative going pulses and negative pulse responsive flip-flops. Likewise the NPN transistors 216 and 226 could be replaced by PNP transistors in a similar switching configuration or by any of the many semi-conductor electronic switches known in the art.

In some low frequency embodiments the transistors 216 and 226 are replaced by switching relays. In still another embodiment the motor may be provided with a suitable switch connected such that the field coils 30 and 46 may be interchanged in the circuit of FIG. 7, allowing the direction of rotation of the motor to be selected.

Referring now to FIGS. 9 and 10 there is shown a stepper motor 300 comprised of a pair of stator frames 302 and 304, each stator frame being, in turn, formed of two "C" shaped pole pieces made from laminated stampings of suitable magnetic material. Thus the stator frame 302 is made of a pair of opposed "C" shaped pole pieces 306 and 308. A field coil 310 encircles one leg of each of the pole pieces 306 and 308 and spaces the members apart from each other. The two pole pieces 306 and 308 each terminate at their distal ends from the field coil 310 in opposed stator pole faces 312 and 314 respectively. The pole faces 312 and 314 each describe a generally circular arc and are separated by a gap.

The stator frame 304 is similarly constructed of two "C" shaped pole pieces 316 and 318 of laminated magnetic material and is positioned in inverted fashion adjacent the frame 302 by a pair of threaded bolts 320. A pair of bushings of nonmagnetic material (not shown) are fitted on the bolts 320 between the frames 302 and 304 to keep the magnetic circuits in one frame separate from the magnetic circuits in the other frame.

A field coil 322 encircles one leg of each of the "C" shaped pole pieces 316 and 318 and spaces the pole pieces apart. The pole pieces 316 and 318 terminate at their distal ends from the field coil 322 in spaced apart, generally circular arc-shaped stator pole faces 313 and 315 respectively.

A pair of facing plates 324 of magnetic material bridge the gap between the stator pole faces of the members 306 and 308 on both sides of the members. The plates 324 are held in place by the bolts 320. Likewise a pair of facing plates 326 bridge both sides of the stator pole face gap between the members 316 and 318 and are also held in place by the bolts 320.

A rotor assembly 328, which is of construction similar to that of the rotor assembly of the embodiment of FIGS. 1–5d, is mounted between the faces of the pole pieces 306, 308, 316 and 318. The rotor assembly comprises two bipole, permanent magnet, cylindrical rotors 330 and 332 mounted on a shaft 334 such that their magnetic polarities are displaced 90 mechanical degrees from each other. The rotor assembly 328 is positioned with the rotor 330 between the faces 312 and 314 of the pole pieces 306 and 308 and the rotor 332 between the faces 313 and 315 of the pole pieces 316 and 318. The rotor shaft 334 is mounted at each end in bearings 336. The rotors 330 and 332 and the shaft 334 are housed in a tubular casing 338 made of non-magnetic material. The bearings 336 are force-fitted into each end of the casing 338. The shaft 334 is prevented from sliding out of the bearings 336 by a bushing 340 crimped onto one end and a gear 342 affixed to the other end by force-fitting, crimping, gluing, or other well known methods. The tubular casing 338 is force-fitted between the faces of the pole pieces 306, 308, 316 and 318.

A permanent magnet 344 is positioned such that its north (N) pole is in magnetic circuit relationship with the pole piece 306 and its south (S) pole is in magnetic circuit relationship with the pole piece 308. The permanent magnet 344 induces a magnetic biasing flux in the stator frame 302 flowing from the north (N) pole of the magnet 344 through the pole piece 306, the pole face 312, the rotor 330, the pole face 314 and the pole piece 308 to return to the south (S) pole of the magnet 344.

A permanent magnet 346 is positioned between the pole pieces 316 and 318 such that its north (N) pole is in magnetic circuit relationship with the pole piece 316 and its south (S) pole is in magnetic circuit relationship with the pole piece 318. The magnet 346 induces a bias flux in the frame 304 flowing from the north (N) pole of the magnet 346, through the pole piece 316, the pole face 313, the rotor 332, the pole face 315 and the pole piece 318 to return to the south (S) pole of the magnet 346.

When a voltage of a proper polarity and strength is applied to the field coil 310, a magnetic flux is induced in the pole pieces 306 and 308 and through the rotor 330 which is of opposite polarity to, and greater in magnitude than, the bias flux due to the magnet 344. Likewise, when a voltage of proper polarity and strength is applied to the field coil 322 there will be induced a magnetic flux in the pole pieces 316 and 318 and the rotor 332 which is of opposite polarity to, and greater in magnitude than, the bias flux due to the magnet 346.

In operation, the motor 300 is similar in physical principles to the embodiment of FIGS. 1–5d discussed above. By selective energization of the field coils 310 and 322, the rotor shaft 334 may be turned to any one of four angular orientations or turned sequentially through all four orientations.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An electric rotating machine comprising permanent magnet rotor means, two pairs of pole pieces with each pair cooperating with a separate axial portion of the rotor means, each pole piece having a salient stator pole which is radially spaced from the rotor means, permanent magnet means in magnetic circuit relationship with each pair of stator pole pieces for generating a magnetic biasing flux passing through the rotor means, energizing means for generating a magnetic stator flux in the salient stator poles, the generated flux passing from said poles through selected axial portions of the rotor means, the strength and direction of the stator flux being respectively greater than and opposed to the bias flux flowing through the rotor means to produce a net magnetic flux, each pair of pole pieces being so aligned with respect to the rotor means and with respect to the other pair of pole pieces that in the quiescent condition and for a given energization of the energizing means the influence of the net magnetic flux on separate axial portions of the rotor means exerts substantially equal torque on the rotor means in opposite directions whereby the rotor means is stabilized in a predetermined angular orientation.

2. An electric rotating machine as recited in claim 1 wherein the permanent magnet biasing means comprises a pair of annular biasing magnets, one for each pair of stator pole pieces.

3. An electric rotating machine comprising permanent magnet rotor means, two pairs of pole pieces with each pair cooperating with separate axial portions of the rotor means, each pole piece having a salient stator pole and the stator poles of each pair of pole pieces being diametrically opposed to each other and radially spaced from the rotor means, field coils encircling a portion of at least one of the stator pole pieces for generating magnetic flux in the salient stator poles, the generated flux passing from the poles through selected axial portions of the rotor means, permanent magnet means in magnetic circuit relationship with each pair of stator pole pieces for generating a magnetic biasing flux passing through the rotor means, means for energizing at least one of the field coils to produce a magnetic stator flux through a selected axial portion of the rotor means, the strength and direction of the stator flux being respectively greater than and opposed to the bias flux flowing through the rotor means, each pair of pole pieces being so aligned with respect to the rotor means and with respect to the other pair of pole pieces that with said field coils de-energized the bias magnetic flux exerts substantially equal torque on different axial portions of the rotor means in opposite directions to stabilize the rotor means in a first predetermined angular orientation and for a given energization of at least one of the field coils the influence of the bias and stator magnetic fluxes on different axial portions of the rotor means exerts substantially equal torque on the rotor means in opposite directions whereby the rotor means is stabilized in a different pre-determined angular orientation.

4. An electric rotating machine comprising permanent magnet rotor means, two pairs of pole pieces with each pair cooperating with separate axial portions of the rotor means, each pole piece having a salient stator pole and the stator poles of each pair of pole pieces being diametrically opposed to each other and radially spaced from the rotor means, a first and a second field coil mounted co-axially with the rotor means for generating magnetic flux in the salient stator poles, the generated flux passing from the poles through selected axial portions of the rotor means, means for selectively energizing the field coils independently of one another, permanent magnet means in magnetic circuit relationship with each pair of stator pole pieces for generating a magnetic biasing flux passing through the rotor means, the strength and direction of which is respectively less than and opposed to the stator flux, each pair of pole pieces being so aligned with respect to the rotor means and with respect to the other pair of pole pieces that when the first field coil is energized the bias and stator magnetic fluxes through different axial portions of the rotor means exert forces on the rotor means to rotate it from an initial position and stabilize it in a first predetermined angular orientation, when the second field coil is energized the bias and stator magnetic fluxes through different axial portions of the rotor means exert forces on the rotor means to rotate it to and stabilize it in a second predetermined angular orientation, when both of the field coils are energized the bias and stator magnetic fluxes through different axial portions of the rotor means exert forces on the rotor means to rotate it to and stabilize it in a third predetermined angular orientation, and when both of the field coils are de-energized the bias magnetic flux through different axial portions of the rotor means exerts forces on the rotor means to return and stabilize it in its initial position.

5. An electric rotating machine as recited in claim 4 wherein the field coils each include a first and a second lead, and the field coil energizing means comprises a two terminal source of direct current, means for connecting one of the direct current source terminals to the first leads of the field coils, a switch having a neutral position and a first, a second, and a third terminal and a contact arm which selectively connects to each of the three switch terminals, means for connecting the contact arm to the other direct current source terminal, the second lead of one of the field coils being connected to the first switch terminal, the second lead of the other field coil being connected to the third switch terminal, a first and a second diode, the first diode being connected between the first and the second switch terminals, the second diode being connected between the second and the third switch terminals, the first and second diodes having polarities such that when the contact arm connects to the second switch terminal, current from the direct current source flows through the diodes and both of the field coils.

6. An electric rotating machine comprising a shaft, means for rotatably mounting the shaft, a pair of permanent magnet rotors mounted on the shaft, two pairs of centrally orificed cup-shaped pole pieces with each pair encompassing a separate one of the rotors, each pole piece having a salient stator pole projecting perpendicularly from a portion of the edge of the orifice in a direction parallel to the axis of rotation of the encompassed rotor and radially spaced therefrom, field coils mounted co-axially with the rotors for generating magnetic flux in the pole pieces, permanent magnet means in magnetic circuit relationship with each pair of stator pole pieces for generating magnetic bias flux passing through the rotors, means for selectively energizing the field coils independently of one another to generate a magnetic stator flux through at least one of the rotors, the strength and direction of the stator flux being respectively greater than and opposed to the bias flux flowing through the rotor to produce a net stator flux, each pair of pole pieces being so aligned with respect to the rotor encompassed by it and with respect to the other pair of pole pieces that when said field coils are de-energized the bias flux acts on both of said rotors to cause the rotors to exert substantially equal torque on the shaft in opposite directions to stabilize the shaft in a first pre-determined angular orientation and for given energizations of the field coils the influence of the bias and net stator fluxes on the rotors causes the rotors to exert substantially equal torque on the shaft in opposite directions whereby the shaft is stabilized in a different predetermined angular orientation, said shaft automatically returning to said first pre-determined angular orientation upon the de-energization of said field coils.

7. An electric rotating machine as recited in claim 6 in which one of the rotors is of a material that has high magnetic coercivity, low permeability and low specific gravity, and a magnetic energy product of at least $3.0 \times 10^6$ gauss-oersteds along the axis of magnetic orientation.

8. An electric rotating machine as recited in claim 10 wherein the permanent magnet biasing means comprises a permanent magnet having opposite magnetic poles affixed to the pole pieces of one of the pairs of pole pieces.

9. An electric rotating machine as in claim 8 wherein the magnet comprises a strip of material one portion of which is adhesively secured to one of the paired cup-shaped pole pieces and is polarized generally in a radially outward direction, and another portion of which is adhesively secured to the other of the paired cup-shaped pole pieces and is polarized generally in the opposite direction.

10. An electric rotating machine comprising a rotor shaft, means for rotatably mounting the rotor shaft, a pair of bipole permanent magnet rotors mounted on the rotor shaft, said rotors respectively having first and second sets of rotor poles, two pairs of stator pole pieces, the respective pairs of stator pole pieces cooperating with separate rotors and having first and second sets of stator poles, one of said first sets of poles having a fixed mechanical angular displacement with respect to the corresponding set of said second sets of poles which is less than 180 degrees, the stator poles of each pair of pole pieces being diametrically opposed to each other and radially spaced from the cooperating rotor, a pair of field coils mounted coaxially with the rotors for generating magnetic flux in the salient stator poles, the generated flux passing from the stator poles through the cooperating rotors, permanent magnet biasing means in magnetic circuit relationship with each pair of stator pole pieces for generating a biasing flux through the rotors, and means for energizing at least one of the field coils to produce magnetic flux through at least one of the rotors in opposition to, and greater in magnitude than, the bias flux whereby the rotors will rotate through a predetermined arc in a predetermined direction.

11. An electric rotating machine as recited in claim 10 wherein the rotors are mounted on the rotor shaft such that their magnetic polarities are angularly displaced substantially ninety degrees and wherein the stator poles of one of the pole pieces are aligned with the corresponding stator poles of the other pair of pole pieces.

12. An electric rotating machine comprising a rotor shaft, means for rotatably mounting the rotor shaft, a pair of bipole permanent magnet rotors mounted on the rotor shaft such that there is a substantial angular displacement between the magnetic polarities of the respective rotors, two pairs of stator pole pieces, each pair of stator pole pieces cooperating with separate rotors, each pole piece having a stator pole and the stator poles of each pair of pole pieces being diametrically opposed to each other and radially spaced from the cooperating rotor, a pair of field coils, each encircling a portion of at least one of the stator pole pieces for generating magnetic flux in the stator poles, the generated flux passing from the stator poles through the cooperating rotors, permanent magnet biasing means in magnetic circuit relationship with each pair of stator pole pieces for generating a biasing flux through the rotors to stabilize the same in a quiescent stationary position with each rotor pole displaced from the corresponding stator pole of opposite polarity by approximately forty-five degrees, and means for automatically energizing the field coils in a predetermined sequence to produce flux through select ones of the rotors in opposition to, and greater in magnitude than, the bias fluxes so as to advance the rotors through a revolution of 360 mechanical degrees upon completion of the energization sequence.

13. An electric rotating machine as recited in claim 12 wherein the means for sequentially energizing the field coils comprises a source of electric pulses, first bistable means responsive to the pulses generated by the pulse source for generating a first and a second output signal which are 180 degrees out of phase with each other, the first and the second output signals having frequencies which are one half the frequency of the pulse source, second bistable means responsive to the first output signal for generating a third output signal having one half the frequency of the first output signal, third bistable means responsive to the second output signal for generating a fourth output signal having one half the frequency of the second output signal, means responsive to the third output signal for energizing a selected one of the field coils while the third output signal is of a pre-determined polarity and magnitude, and means responsive to the fourth output signal for energizing the other field coil while the fourth output signal is of a pre-determined polarity and magnitude.

14. Electric rotating machine comprising a shaft, means for rotatably mounting the shaft, a pair of permanent magnet rotors mounted on the shaft, a pair of stator frames, each stator frame being formed of two opposed, "C" shaped pole pieces, separate field coils encircling portions of the pairs of pole pieces for generating a magnetic flux in the pole pieces, the pole pieces of each pair being spaced apart from each other and terminating at their distal ends from the encircling field coil in stator poles, the stator poles of each stator frame being radially spaced from a separate one of the rotors, permanent magnet means in magnetic circuit relationship with each pair of stator pole pieces for generating magnetic bias flux passing through the rotors to stabilize the same in a quiescent stationary position with each rotor pole displaced from the corresponding stator pole of opposite polarity by approximately forty-five degrees, means for selectively energizing the field coils independently of one another to generate a magnetic stator flux through at least one of the rotors, the strength and direction of the stator flux being respectively greater than and opposed to the bias flux flowing through the rotor to produce a net stator flux, each pair of pole pieces being so aligned with respect to the rotor from which their pole faces are radially spaced and with respect to the other pair of pole pieces that for given energizations of the field coils the influence of the bias and net stator fluxes on the rotors causes the rotors to exert substantially equal torque on the shaft in opposite directions whereby the shaft is stabilized in a pre-determined angular orientation.

15. An electric rotating machine as recited in claim 14 wherein the permanent magnet biasing means comprises a permanent magnet having opposite magnetic poles affixed to the pole pieces of one of the stator frames.

16. An electric rotating machine comprising a rotor shaft, a pair of permanent magnet rotors mounted on the rotor shaft, said rotors respectively having first and second sets of rotor poles, two pairs of stator pole pieces, the respective pairs of stator pole pieces cooperating with separate rotors and having first and second sets of stator poles, one of said first sets of poles being angularly displaced substantially ninety degrees from the corresponding set of said second sets of poles, the stator poles of each pair of pole pieces being diametrically opposed to each other and radially spaced from the cooperating rotor, separate field coils encircling portions of the pairs of stator pole pieces for generating magnetic flux in the stator poles, the generated flux passing from the stator poles through the cooperating rotors, permanent magnet biasing means in magnetic circuit relationship with each pair of stator pole pieces for generating a biasing flux through the rotors, and means for energizing at least one of the field coils to produce magnetic flux through at least one of the rotors in opposition to, and greater in magnitude than, the bias flux whereby the rotors will rotate through a pre-determined arc in a pre-determined direction.

17. An electric rotating machine as recited in claim 16 wherein the rotors are mounted on the rotor shaft such that their magnetic polarities are angularly displaced substantially ninety degrees and wherein the stator poles of one of the pairs of pole pieces are aligned with the corresponding stator poles of the other pair of pole pieces.

* * * * *